United States Patent [19]
Leach et al.

[11] Patent Number: 5,977,503
[45] Date of Patent: Nov. 2, 1999

[54] ATTACHMENT DEVICE FOR ELECTRICAL DISCHARGE MACHINE

[76] Inventors: Thomas S. Leach, deceased, late of Aurora, Ohio; by Esther L. Leach, executrix, 79 Eldridge Rd., Aurora, Ohio 44202; Robert A. Leach, 959 A Snowfall Spur, Akron, Ohio 44313

[21] Appl. No.: 08/963,029

[22] Filed: Nov. 3, 1997

[51] Int. Cl.[6] .............................. B23H 1/04; B23H 11/00
[52] U.S. Cl. ....................................... 219/69.15; 219/69.2
[58] Field of Search .............................. 219/69.15, 69.14, 219/69.2, 69.11

[56] References Cited

U.S. PATENT DOCUMENTS

| | | | |
|---|---|---|---|
| 4,538,043 | 8/1985 | Alexander | 219/69.15 |
| 4,705,932 | 11/1987 | Aso et al. | 219/69.14 |
| 4,717,803 | 1/1988 | Alexandersson | 219/69.15 |
| 5,041,709 | 8/1991 | Schneider et al. | 219/69.11 |
| 5,420,388 | 5/1995 | Girardin | 219/69.15 |
| 5,618,449 | 4/1997 | Houman et al. | 219/69.11 |

*Primary Examiner*—Geoffrey S. Evans

[57] ABSTRACT

A rotating spindle attachment device particularly useful in electrical discharge machining for detachably mounting an electrode to the ram of an electrical discharge machine (EDM). The unit incorporates an electric drive motor, threaded drive shaft, detachable electrode chuck, and water-tight seal(s) for use in mounting, sealing, and rotating a consumable electrode about its vertical axis relative to the workpiece.

1 Claim, 3 Drawing Sheets

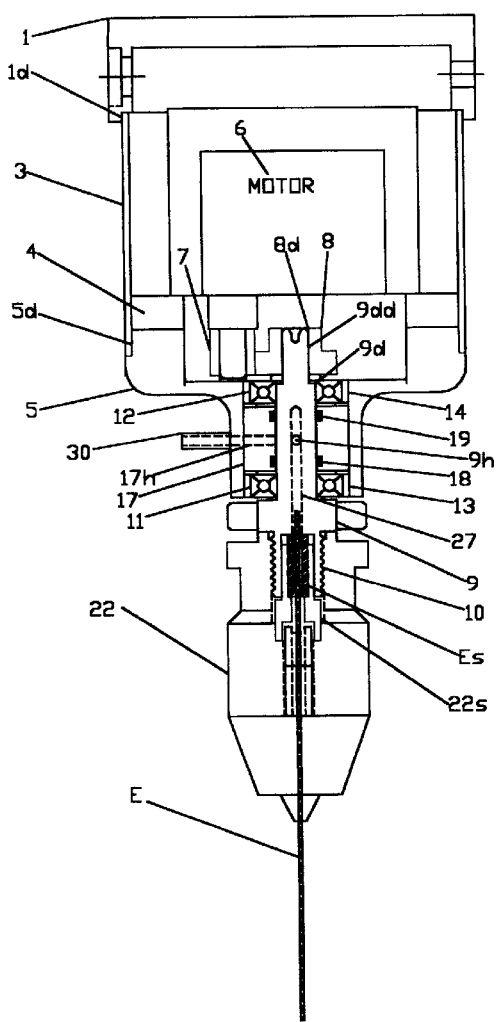
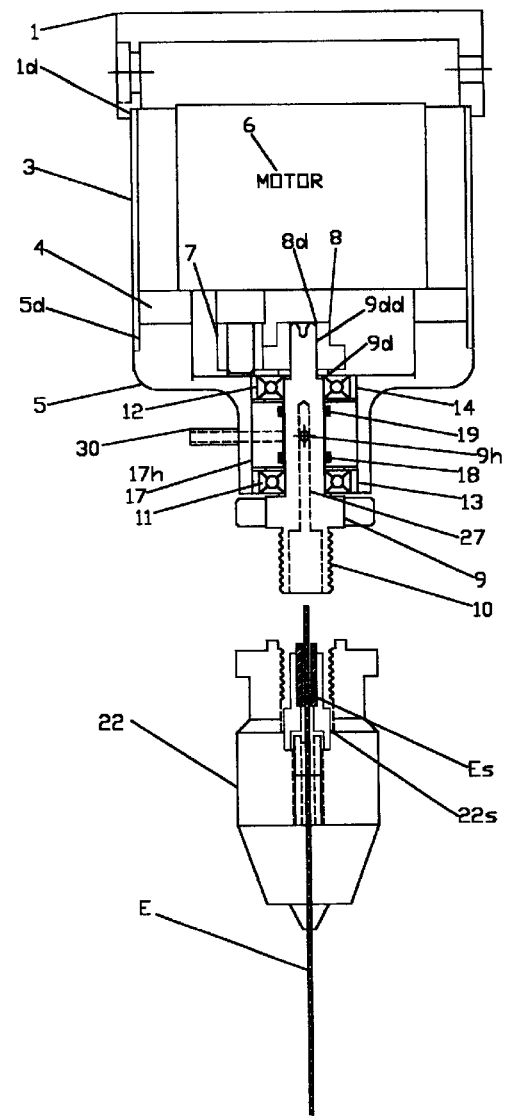
FIG. 1A
FIG. 1B

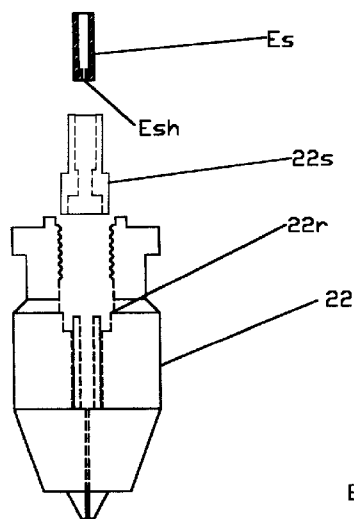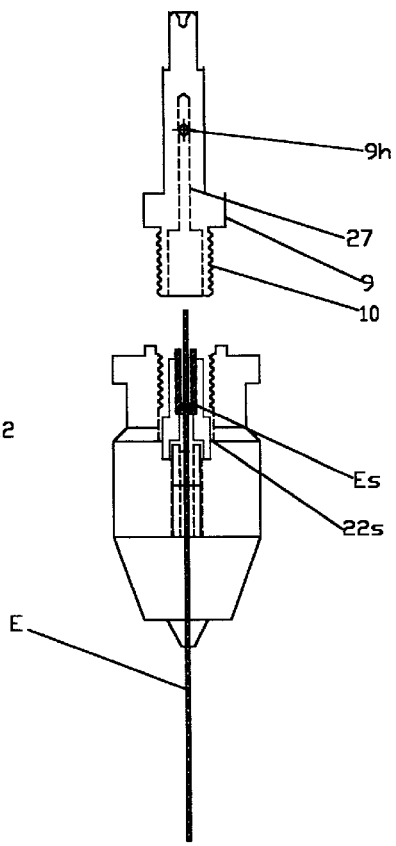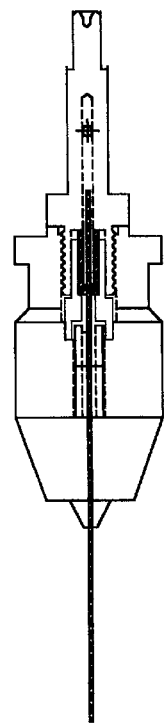
FIG. 2A
FIG. 2B
FIG. 2C

ATTACHMENT DEVICE FOR ELECTRICAL DISCHARGE MACHINE

BACKGROUND OF THE INVENTION

1. Field of the Invention

This invention relates to the area of machine tools and more particularly relates to a rotating spindle attachment device for detachably mounting an electrode on an electrical discharge machine (EDM). The invention includes a detachable spindle assembly incorporating an electric drive motor, threaded drive shaft, detachable electrode chuck, and water-tight seal(S) for use in mounting, rotating, and sealing a consumable electrode about its vertical axis relative to the workpiece.

2. Description of the Related Art

The present invention relates to a new and novel attachment device that can be detachably mounted for use with an electrical discharge machine (EDM). EDM machining is a relatively recent technological innovation and greatly expedites the forming of apertures, cavities or holes in a metal workpiece particularly where relatively small size apertures, cavities or holes are required and with relatively close tolerances.

In the present invention the electrode, being consumable, is detachably mounted on the EDM machine for rotational movement about its axis so as to remove metal from the workpiece, by fusion, so as to form apertures or holes in the workpiece as one would accomplish by conventional drilling or milling machines. Conventional EDM machines typically supply the means (via industrial standard fluid pumps and connectors) to communicate and deliver dielectric oil to the electrode and workpiece as it is desirable, during EDM machining, to effectively flush particles therefrom.

The ability to rotate the electrode makes the flushing operation easier because the rotational movement of the electrode mechanically aids in the exchange of dielectric fluid between the electrode and workpiece. In addition, a rotating electrode is engaged with the workpiece on all sides which causes the entire surface of the electrode to be used thus permitting a greater electrode surface area to be involved in the machining process which allows the machining current to be increased to improve the metal removal rate.

Also, electrode rotation greatly reduces side wall taper of the workpiece. Heretofore, known attachment devices for rotably mounting and sealing the electrode have not been entirely satisfactory especially from a cost effective point of view. In addition, such prior rotational mounting devices have not been satisfactory in enabling the operator to quickly and easily install the device to an EDM machine. Also, such prior rotational mounting devices have not been satisfactory in enabling the operator to quickly and easily replace and seal a plurality of electrode diameters while at the same time maintaining a high degree of machining efficiency and accuracy.

BRIEF SUMMARY OF THE INVENTION

It is, therefore, an object of the present invention to provide a relatively inexpensive, detachable rotating EDM spindle which can be easily and quickly mounted to an EDM machine.

It is another object of the present invention to provide a relatively compact rotating EDM spindle enabling the machine operator to quickly and easily replace and seal a plurality of electrode diameters.

It is a further object of the present invention to provide a compact rotating EDM spindle to improve metal removal rates and machining capacity with relatively short set up time and water-tight flushing throughout hollow consumable electrodes.

The present invention finds particular utility as a detachable compact tool to greatly expedite the forming of cavities or holes in metal workpieces and to remove metal from the workpiece with relatively close tolerances.

These and other objects of the present invention will become apparent from a reading of the following specification, taken in conjunction with the enclosed drawings.

BRIEF DESCRIPTION OF THE DRAWINGS

FIG. 1A is an elevation view of the rotating EDM spindle device in accordance with this invention;

FIG. 1B is an elevation view of the rotating EDM spindle device illustrating an electrode chuck in a detached position;

FIG. 2A is an elevation view of an electrode chuck assembly;

FIG. 2B is an elevation view of a detached assembly;

FIG. 2C is an elevation view of a mounted assembly;

DETAILED DESCRIPTION OF THE PREFERRED EMBODIMENTS

Figure 3A:
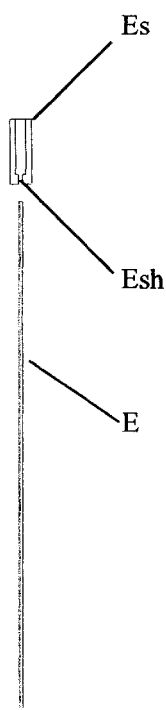
FIG. 3A is an elevation view of an electrode and rubber seal.
Figure 3B:
FIG. 3B is an elevation view illustrating a rubber seal mounted to an electrode.

Referring to FIG. 1A and FIG. 1B, there is illustrated the electrode mounting device for attachment to an electrical discharge machine (EDM). FIG. 1A illustrates the electrode chuck 22 attached to the threaded diameter 10 of drive shaft 9; whereby FIG. 1B illustrates the electrode chuck 22 in a detached position relative to the threaded diameter 10 of drive shaft 9.

The invention utilizes, but is not limited to, an industry standard Albrecht chuck model # CT65-½, shown at 22 in FIG. 1B, modified to include a small hole through its center. In the preferred embodiment, the threaded diameter 10 of drive shaft 9 extends a suitable distance from the cylindrical housing 5. Drive shaft 9 embodies a reduced diameter $9d$ which is journaled by roller bearings 11 and 12. The roller bearings 11 and 12 are supported by suitable insulating rings 13 and 14. The insulating rings 13 and 14 are captured within the hollow diameter of cylindrical housing 5.

As illustrated in FIG. 1A, the inner diameter of the sealing bearing 17 embodies O-Ring seals 18 and 19 to create a water-tight seal around the reduced diameter $9d$ of drive shaft 9. The sealing bearing 17 embodies a cross-hole $17h$ communicating with intake valve 30. The reduced diameter $9d$ of drive shaft 9 also embodies a suitable cross hole $9h$ to communicate with cross hole $17h$ and deliver fluid into passageway 27.

FIG. 1A further shows the drive shaft 9 embodying a further reduced diameter $9dd$ which is fixedly secured into the hollow diameter $8d$ of drive gear 8. Drive gear 8, engaged and powered by the motor gear 7, rotates by means of standard 110 VAC electric current enabling the drive shaft 9 to rotate about its axis.

Referring again to FIG. 1A, the hollow cylindrical shroud 3 is captured within the reduced diameter 5d and counter-bored diameter 1d. The base plate 1 is attached by suitable socket screw fasteners (not shown) to the mounting plate 4 to fixedly fasten the cylindrical housing 5, mounting plate 4, cylindrical shroud 3, and base plate 1.

Referring now to FIG. 2B, it is important to note that hollow sealing component 22s is fixedly mounted into the standard inner cavity region 22r of the threaded end of electrode chuck 22 as shown in FIG. 2B. By way of example only and not by way of limitation, custom seal Es is constructed of, but not limited to, natural rubber or suitable flexible material—manufactured by Atlantic India Rubber Company, Part No. 858—and detachably mounts into the sealing component 22s. The custom seal Es is modified by way of, but not limited to, drilling, piercing, or otherwise puncturing a small hole Esh through the center of the blank end as shown in FIG. 2A. By way of example only and not by way of limitation, the custom seal Es embodies either a 1/32", 1/16", 3/32", or pierced hole Esh, any of which may be used independently to effectively create a water-tight seal around the outside diameter of the machine operator's preferred size electrode E. Whereby the custom seals Es are constructed of flexible material, it is possible for one (1) custom seal Es to accommodate and maintain a water-tight seal around a plurality of electrode E diameters. Hence, the unique and non-obvious combination of electrode chuck 22, sealing component 22s, and custom seal Es facilitates the formation of a water tight seal around a plurality of electrode E diameters within the specified range of electrode chuck 22.

Figure 3C:
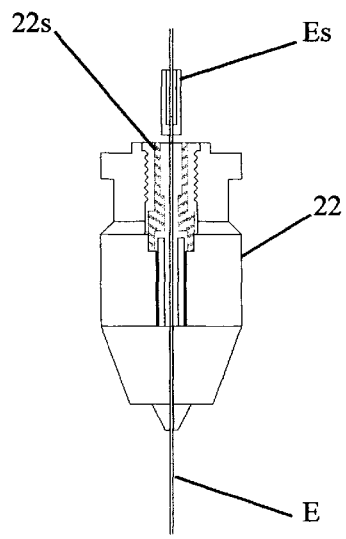
FIG. 3C is an elevation view of an electrode chuck and rubber seal.
Figure 3D:
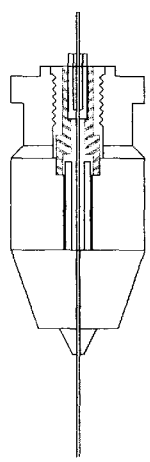
FIG. 3D is an elevation view of an electrode chuck assembly.

Referring now to FIG. 3C, the best mode for carrying out the invention is for the machine operator to initially select a custom seal Es with a suitable small hole Esh and subsequently insert one (1) electrode E into and through the center of small hole Esh. Next, the machine operator places the electrode E, together with attached custom seal Es into and through the opening formed by the threaded end of the electrode chuck 22 until the custom seal Es is securely housed inside the hollow sealing component 22s as shown in FIG. 3D. As best shown in FIG. 2C, the machine operator mounts the electrode chuck and electrode assembly onto the threaded diameter 10 of drive shaft 9. Ultimately, and upon complete thread engagement, said thread mounting action slightly compresses the overall length of custom seal Es resulting in the formation of an enhanced and un-interrupted water-tight passageway facilitating the communication and delivery of dielectric fluid into and through the hollow diameter of electrode E.

By the foregoing arrangement and construction, the machine operator may quickly and easily detach an electrode chuck 22 from drive shaft 9 allowing the operator to quickly and easily replace and seal a plurality of consumable electrode E diameters with minimal machine down time. The simple and compact design of the invention can be produced at an affordable price and requires low maintenance and minimal set up resulting in less down time for the EDM machine. These and other advantages of the present invention will be recognized when considered in reference to the accompanying drawings and the claims appended hereto.

What is claimed is:

1. An electrode mounting device for electrical discharge machine for rotatably mounting hollow consumable electrodes, comprising:

a spindle housing having an inner cavity and a dielectric inlet port;

a hollow rotatble drive shaft vertically mounted within said spindle housing and fixedly secured to drive gear;

an electrically powered motor within said housing and having a motor gear which engages drive gear for rotating the drive shaft about a vertical axis;

an electrode chuck with an inner cavity modified to include a relatively small hole through its center;

said electrode chuck being threadably mounted onto threaded end of said drive shaft;

a hollow sealing component, fixedly attached into said inner cavity of said electrode chuck;

a hollow elastomeric custom seal detachably mounted into said sealing component, a rectangular base plate fixedly secured to said spindle housing for detachably mounting an to electrical discharge machine.

* * * * *